(12) United States Patent
Francois et al.

(10) Patent No.: US 8,094,718 B2
(45) Date of Patent: Jan. 10, 2012

(54) MOTION-COMPENSATED SPATIO-TEMPORAL WAVELET COMPRESSION OF VIDEO DATA WITH OPTIMISED PERMUTATION OF THE FRAMES

(75) Inventors: Edouard Francois, Bourg des Comptes (FR); Guillaume Boisson, Rennes (FR); Jerome Vieron, Bedee (FR); Philippe Robert, Thorigne-Fouillard (FR); Gwenaelle Marquant, La Chapelle Chaussie (FR)

(73) Assignee: Thomson Licensing, Boulogne-Billancourt (FR)

( * ) Notice: Subject to any disclaimer, the term of this patent is extended or adjusted under 35 U.S.C. 154(b) by 1501 days.

(21) Appl. No.: 10/592,627

(22) PCT Filed: Jan. 12, 2005

(86) PCT No.: PCT/EP2005/000205
§ 371 (c)(1),
(2), (4) Date: Sep. 12, 2006

(87) PCT Pub. No.: WO2005/096631
PCT Pub. Date: Oct. 13, 2005

(65) Prior Publication Data
US 2007/0201557 A1    Aug. 30, 2007

(30) Foreign Application Priority Data
Mar. 12, 2004  (EP) .................................. 04290692

(51) Int. Cl.
*H04N 7/36* (2006.01)
(52) U.S. Cl. ............................. 375/240.11; 375/240.12
(58) Field of Classification Search ............. 375/240.11, 375/240.12
See application file for complete search history.

(56) References Cited

U.S. PATENT DOCUMENTS
5,621,464 A    4/1997  Teo et al.
2001/0055337 A1   12/2001  Matsuzaki et al.
2005/0117647 A1*   6/2005  Han ........................ 375/240.16

OTHER PUBLICATIONS

Boisson et al.: " Motion-compensated spatio-temporal context-based arithmetic coding for full scalable video compression", Proceedings of the 23rd Picture Coding Symposium PCS 2003. No. 017, Apr. 23, 2003, pp. 1-6.
M. Van Der Schaar et al.: "Unconstrained Motion Compensated Temporal Filtering (UMCTF) Framework for Wavelet Video Coding", Transactions of the IEEE International Conference on Acoustics, Speech, and Signal Processing (ICASSP), vol. 1 of 6, Apr. 6, 2003, pp. III-81-III-84, IEEE, New York, NY US.
B. Pesquet-Popescu et al.: "Embedded color coding for scalable 3D wavelet video compression" Proceedings of the SPIE, vol. 4067, No. 1-3, 2000, pp. 219-229.
K. Doerffer et al: "FTS—A New Algorithm for Optimal Row-Placement" Proceedings of the 37th Midwest Symposium on Circuits and Systems, vol. 1, Aug. 3, 1994, pp. 367-369.
Search Report Dated May 11, 2005.

* cited by examiner

*Primary Examiner* — Christopher S Kelley
*Assistant Examiner* — Jeffery Williams
(74) *Attorney, Agent, or Firm* — Robert D. Shedd; Jeffrey M. Navon

(57) ABSTRACT

In video encoding, the video frames are spatio-temporally filtered for reduction of spatial and temporal redundancy before they are entropy encoded. Known filtering schemes consider temporally successive frames and are static. It is probable but not necessary that successive frames are most efficient to encode. Therefore, a plurality or all possible frame order permutations are considered for a group of frames (GOP) and evaluated based on a global criterion, which is the sum of local criterion values computed over successive subsets of permuted frames. The local criterion value is deduced from motion estimation processed on each considered set of frames. The best ordering is chosen as the one that minimizes the global criterion value.

10 Claims, 5 Drawing Sheets

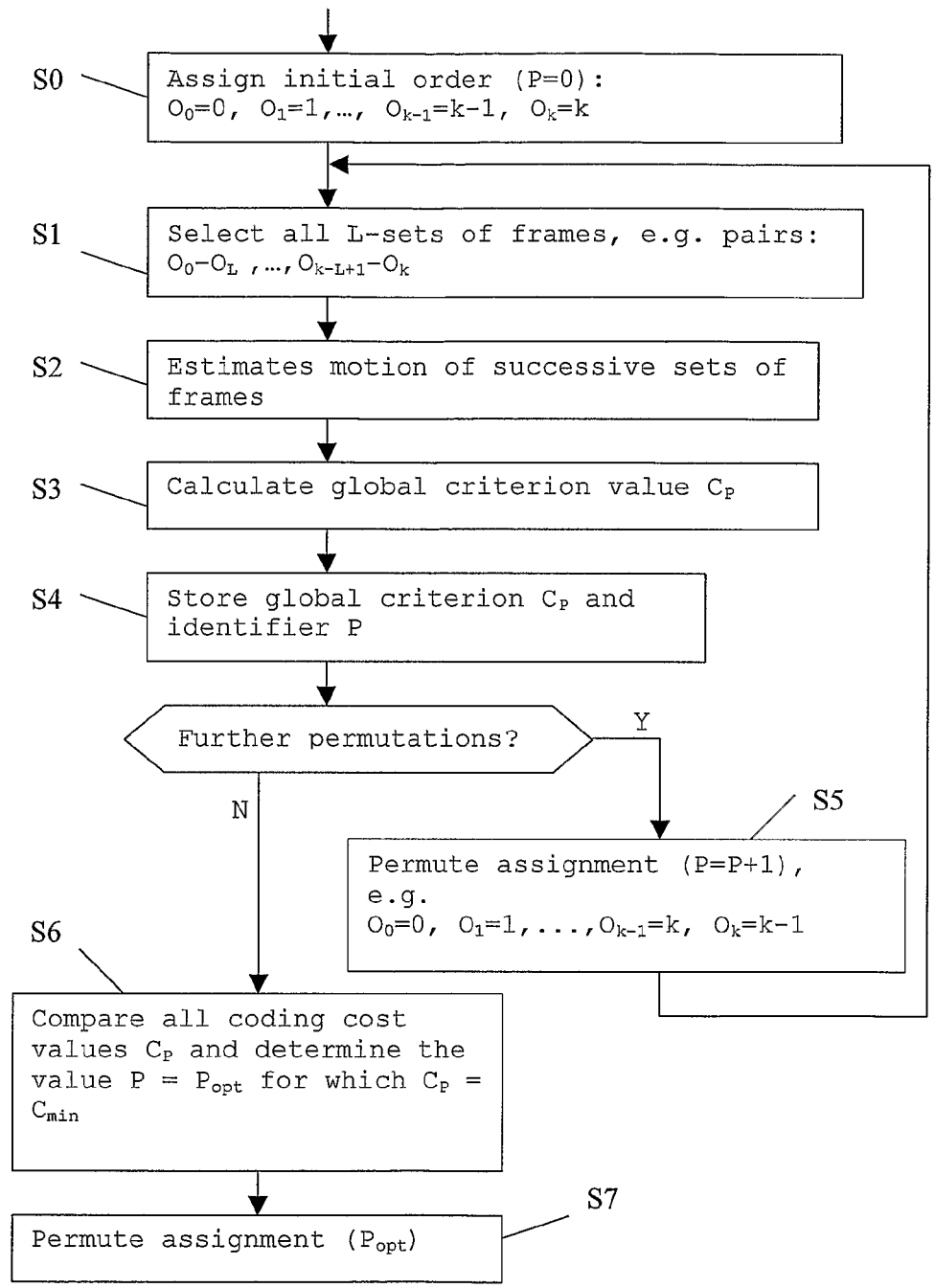
Fig.7: Exhaustive process

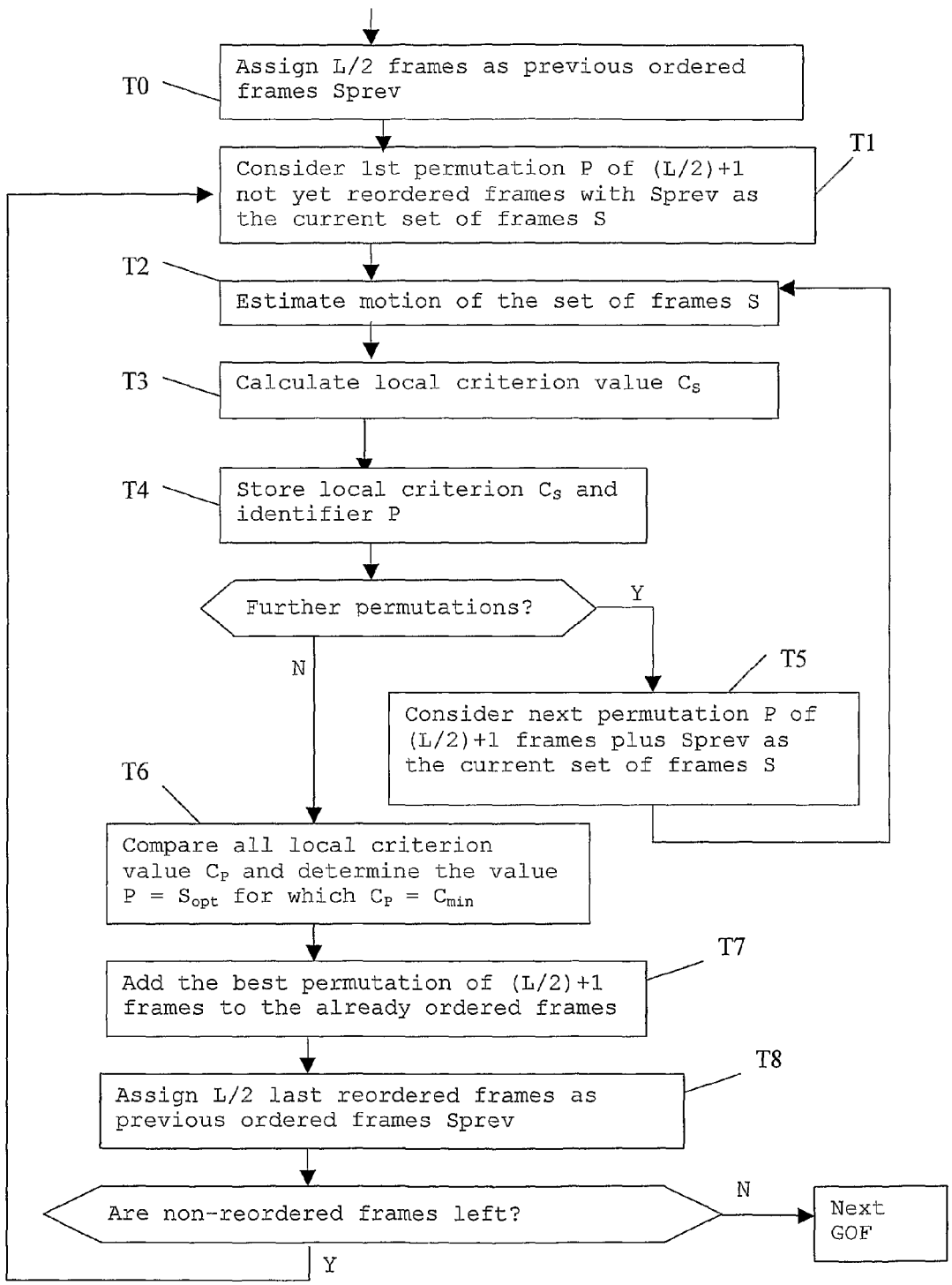
Fig.8: Iterative process

MOTION-COMPENSATED SPATIO-TEMPORAL WAVELET COMPRESSION OF VIDEO DATA WITH OPTIMISED PERMUTATION OF THE FRAMES

This application claims the benefit, under 35 U.S.C. §365 of International Application PCT/EP05/000205, filed Jan. 12, 2005, which was published in accordance with PCT Article 21(2) on Oct. 13, 2005 in English and which claims the benefit of European patent application No. 04290692.5, filed Mar. 12, 2004.

FIELD OF THE INVENTION

This invention relates to a method and apparatus for video encoding and to a method and apparatus for video decoding. In particular, the invention relates to the sequential order of frames in a 2D+t subband/wavelet transform using motion compensated temporal filtering.

BACKGROUND

Advanced video encoding often uses a three-dimensional transform, with one temporal and two spatial dimensions. Prior to encoding, consecutive video frames are usually divided into groups of pictures (GOP), similar to the GOP structure used in MPEG, with the number of frames per group being constant or flexible, and then analyzed, wherein wavelets are a known analysis technique. Wavelet technique is an iterative method for breaking a signal or a series of values into spectral components, by taking averages and differences of values. Thereby it is possible to view the series of values in different resolutions corresponding to frequencies, or subbands of the spectrum.

The mentioned three-dimensional transform is known as 2D+t subband/wavelet transform along motion trajectories. Such transform is commonly implemented using a Motion Compensated Temporal Filter (MCTF), which filters pairs of video frames and produces a temporal low frame, a temporal high frame and a motion field, i.e. set of motion vectors, between the filtered pair of frames. Thereby, many pixels in one frame can be predicted from pixels of the other frame and their associated motion vector, while the other pixels that cannot be predicted are called "unconnected" and must be separately encoded and transmitted. A decoder generates predicted frames based on previous frames, motion vectors and received data referring to unconnected pixels.

The first step of the described MCTF procedure is the selection of pairs of frames to filter according to a predefined selection scheme. This is called temporal decomposition of the GOP. Known temporal decomposition schemes consider temporally successive pairs of frames, assuming that such frames provide the highest similarity and therefore enable the most effective coding.

SUMMARY OF THE INVENTION

There is however a need to further optimize video encoding techniques, thereby reducing the coding cost of video frames, i.e. the number of resulting bits.

The present invention is based on the recognition of the fact that it may be advantageous to filter pairs of frames that need not be temporally successive. In particular, it may be most advantageous to determine adaptively the order of frames to be filtered, individually for each group of frames (GOF) or GOP.

A method to encode video frames using adaptive temporal decomposition is disclosed in claim 1. An apparatus that utilizes the method is disclosed in claim 8.

A method to decode encoded video frames is disclosed in claim 7. A corresponding decoder is disclosed in claim 11.

According to the invention, frames are reordered at each temporal decomposition level in order to better reduce temporal redundancy. Reordering of frames is performed separately from the encoding process itself. This separation may be advantageous, because it allows keeping a predefined temporal decomposition scheme. The reordering is based on the computation of similarity measures between sets of L frames. In a simple version, a set is a pair, i.e. L=2. A similarity measure is determined using motion fields. The reordering process can be considered as an external process of the coder and does not modify its default structure. Hence it is possible to work as usual without this frame reordering.

The invention comprises:
a first criterion used to evaluate the similarity between different frame sets, and especially between pairs of frames; it is called local criterion;
a second criterion, based on the first criterion, used to perform the frames reordering at each level of the temporal filtering; it is called global criterion;
methods for deciding the optimal frames reordering of a GOF; one exhaustive method and one simplified method are proposed.

In a preferred embodiment of the invention, the order of the frames within a GOF is progressively determined, based on the measurement of a local similarity measure of a set of K frames. The inventive adaptive frame ordering includes the following steps:

Starting from scratch, a motion estimation is performed on each permutation of K frames among all the considered frames. The motion estimation computes a local similarity measure of the permutation.

The best permutation is chosen and gives the initial reordering of the frames. Then from this initial reordering, for each new possible permutation of the remaining non reordered frames, the motion and its associated local similarity measure is computed. The best permutation is chosen and added to the set of already reordered frames. This process is repeated until all frames are reordered.

Consequently, the selected reordering must be known for establishing the original sequence of frames after decoding. This can be achieved e.g. by transmitting the filtering mode for each filtering step, or the sequence numbers of the frames, or by defining unique identifiers for all possible or allowed permutations of frames and transmitting the identifier for the used permutation, so that it can be reversed.

Advantageously, the adaptive ordering of frames can be recursively applied to further or all temporal decomposition levels of the MCTF.

A method for decoding wavelet encoded video data structured in groups of frames and being encoded using MCTF includes the steps of
performing spatio-temporal synthesis of subgroups of frames within a temporal level; and
temporally reordering the frames within the temporal level according to reordering information which can be extracted from the encoded video data.

The decoding method may apply the re-ordering of the frames to those temporal levels where frames were adaptively ordered by the encoding method. The reordering information may comprise for a specific re-ordering the level where to apply it.

An encoder according to the invention includes
a motion estimation unit working on a set of frames and providing a local similarity measure between these frames;
means for progressively reordering frames based on the evaluation, using the motion estimation process, of each possible permutation of not yet reordered frames;
means for filtering the reordered frames in the optimal sequential order; and
means for associating the identifier for the optimal sequential order of frames with the encoded bitstream.

Correspondingly, a decoder according to the invention includes
means for performing spatio-temporal synthesis of subgroups of frames within a first temporal level; and
means for temporally reordering the frames within the first temporal level according to reordering information, the reordering information being extracted from the encoded video data. Synthesis is in video coding commonly known as the process that is reverse to filtering, and uses very similar or even identical structures, e.g. filters.

An advantage of the invention is that the reordering process gives more efficiency to the temporal filtering, thus reducing the coding cost, since the best matching sets of frames of a GOF can be used for filtering. Another advantage of the invention is that it may be performed separately from the encoding process, with a limited complexity. Another advantage of the invention is its generality, since it is not limited to the case of temporal filtering and motion estimation applied on pairs of frames, but it may consider the generic case of any number of frames.

Further objects, features and advantages of the invention will become apparent from a consideration of the following description and the appended claims when taken in connection with the accompanying drawings.

BRIEF DESCRIPTION OF THE DRAWINGS

Exemplary embodiments of the invention are described with reference to the accompanying drawings, which show in FIG. 1 the overall architecture of a video encoder using MCTF;

FIG. 7 a flow chart for an exhaustive adaptive frame ordering process; and

FIG. 8 a flow chart for an iterative adaptive frame ordering process.

DETAILED DESCRIPTION OF THE INVENTION

Figure 1:
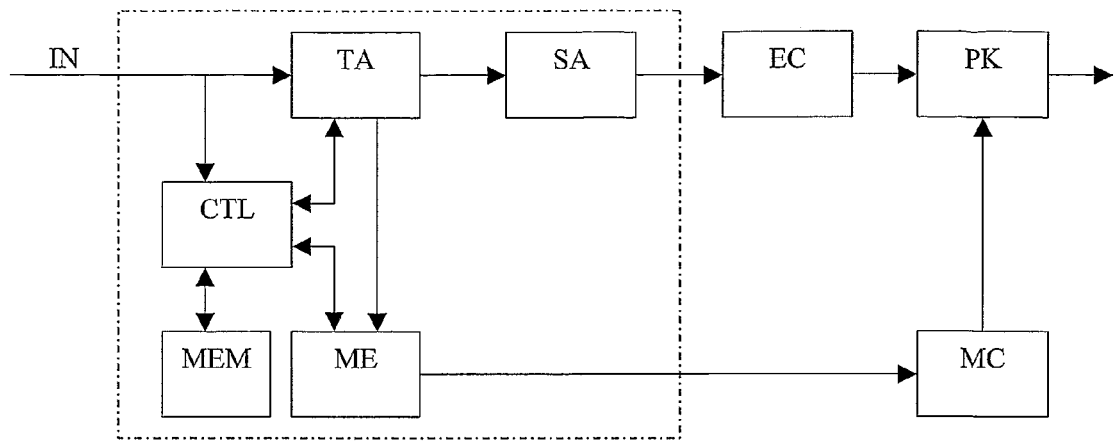

FIG. 1 shows the global architecture of an exemplary video encoder based on its function blocks. The coding process is based on the steps described in the following:

A motion-compensated temporal analysis (TA) is applied on the successive frames of a Group Of Frames (GOF). This gives as many frames as there were initially in the GOF, each of these frames corresponding to a specific temporal frequency band. This temporal filtering uses motion fields computed on the source frames.

Motion fields, that is, set of motion vectors, come from the motion estimation (ME). Motion estimation works on successive frames of the GOF. In a simple version, ME is applied on pairs of frames.

ME and TA are applied on the source successive frames of the GOF and generate low and high frequency frames. Then the process ME-TA can be iteratively applied to the low frequency frames. Each iteration represents a temporal decomposition level.

The resulting filtered frames are then spatially analyzed (SA) to obtain different spatio-temporal frequency bands.

The spatio-temporal wavelet coefficients are spatially encoded using an entropy coder (EC). Motion fields are encoded using the motion coder (MC). Finally, binary data coming from EC and MC are multiplexed by the packetizer (PK) to provide the output bitstream.

In the classical process, ME and TA are applied at each decomposition level on the temporally successive frames.

In one embodiment of the invention, frames are reordered at each temporal decomposition level in order to better reduce temporal redundancy. In other embodiments however, frames may be reordered at multiple, but not all temporal decomposition levels. Frames reordering is performed by a control unit CTL. The reordering is based on the computation of similarity measures between sets of L frames, wherein in a simple version a set is a pair, L=2. Similarity measure is determined using motion fields. The CTL unit can be considered as an external element of the coder and does not modify its default structure. Hence it is possible to work as usual without this CTL.

More precisely, the invention proposes:
a local criterion used to evaluate the similarity between different frames (and especially between pairs of frames);
a global criterion, based on the previous local criterion, used to perform the frames reordering at each level of the temporal filtering;
methods for deciding the optimal frames reordering of a GOF; one exhaustive method and one simplified method are proposed.

These different points are explained in details below.

A GOF with N frames is considered. At a temporal decomposition level n be $K_n$ the number of frames $I_p$, with $p=0, \ldots, K_n-1$, to be processed. Consider first the most general case, in which motion estimation takes a set of L input frames $\{I_{p1}, \ldots, I_{pL}\}$ and computes a set of motion fields $\{MF_{p1 \leftrightarrow p2}, \ldots, MF_{pL-1 \leftrightarrow pL}\}$. Note that $MF_{i \leftrightarrow j}$ represents either the forward field $MF_{i \leftarrow j}$ from $I_j$ to $I_i$, or the backward field $MF_{i \rightarrow j}$ from $I_i$ to $I_j$, or both the forward and backward fields.

The following section describes the
Definition of a Global Criterion.

We consider that the quality of the temporal filtering of $\{I_{p1}, \ldots, I_{pL}\}$ using $\{MF_{p1 \leftrightarrow p2}, \ldots, MF_{pL-1 \leftrightarrow pL}\}$ can be measured by a local objective quality criterion $C(I_{p1}, \ldots, I_{pL}, MF_{p1 \leftrightarrow p2}, \ldots, MF_{pL-1 \leftrightarrow pL})$. The first characteristic of the inventive method is the definition of a global criterion to find for each temporal decomposition level n the best order $(O_0, \ldots, O_{K_n-1})$ of the frames, with $O_i \in \{0, \ldots, K_n-1\}$ with $O_j \neq O_i$ for any $j \neq i$, and associated motion fields that will minimize the total criterion value $C_{total}$:

$$C_{total}(O_0, \ldots, O_{K_n-1}) = \sum_{i=0,\ldots,K_n/2} C(I_{O_{2i}}, \ldots, I_{O_{2i+L-1}}, MF_{O_{2i} \leftrightarrow O_{2i+1}}, \ldots, MF_{O_{2i+L-2} \leftrightarrow O_{2i+L-1}}) \quad \text{(Eq. 1)}$$

The following examples use L=2 and L=3.

For instance, let us consider $K_n$=8. If we evaluate the 2 orders (0,1,2,3,4,5,6,7) and (2,5,4,1,0,7,6,3), in the case L=2, we will have to compute:

$$C_{total}(0,1,2,3,4,5,6,7) = C(I_0,I_1,MF_{0\leftrightarrow 1}) + C(I_2,I_3,MF_{2\leftrightarrow 3}) + C(I_4,I_5,MF_{4\leftrightarrow 5}) + C(I_6,I_7,MF_{6\leftrightarrow 7}) \quad \text{(Eq. 2)}$$

$$C_{total}(2,5,4,1,0,7,6,3) = C(I_2,I_5,MF_{2\leftrightarrow 5}) + C(I_4,I_1,MF_{4\leftrightarrow 1}) + C(I_0,I_7,MF_{0\leftrightarrow 7}) + C(I_6,I_3,MF_{6\leftrightarrow 3}) \quad \text{(Eq. 3)}$$

In the case L=3, we will have to compute:

$$C_{total}(0,1,2,3,4,5,6,7) = C(I_0,I_1,I_2,MF_{0\leftrightarrow 1}, MF_{1\leftrightarrow 2}) + C(I_2,I_3,I_4,MF_{2\leftrightarrow 3}, MF_{3\leftrightarrow 4}) + C(I_4,I_5,I_6,MF_{4\leftrightarrow 5}, MF_{5\leftrightarrow 6}) + C(I_6,I_7,I_8,MF_{6\leftrightarrow 7},MF_{7\leftrightarrow 8}) \quad \text{(Eq. 4)}$$

$$C_{total}(2,5,4,1,0,7,6,3) = C(I_2,I_5,I_4,MF_{2\leftrightarrow 5}, MF_{5\leftrightarrow 4}) + C(I_4,I_1,I_0,MF_{4\leftrightarrow 1}, MF_{1\leftrightarrow 0}) + C(I_0,I_7,I_6,MF_{0\leftrightarrow 7}, MF_{7\leftrightarrow 6}) + C(I_6,I_3,I_8,MF_{6\leftrightarrow 3},MF_{3\leftrightarrow 8}) \quad \text{(Eq. 5)}$$

Let us note that in this last case, it is necessary to use an extra frame denoted $I_8$ that is for instance obtained using a copy of the last frame of the set of L frames.

The following section describes the
Definition of Possible Local Criteria.

The second characteristic of the inventive method is the definition of local objective quality criteria, generally $C(I_{p1}, \ldots, I_{pL}, MF_{p1\leftrightarrow p2}, \ldots, MF_{pL-1\leftrightarrow pL})$, that qualify the motion estimation between frames $\{I_{p1}, \ldots, I_{pL}\}$ to obtain motion fields $\{MF_{p1\leftrightarrow p2}, \ldots, MF_{pL-1\leftrightarrow pL}\}$.

General Criterion

Let us note $I_{cur}$ a modified version of the frame of index $p_{L/2+1}$:

$$I_{cur} = \alpha_0 \cdot I_{pL/2+1}$$

with $\alpha_0$ a given coefficient.

The estimation process tries to estimate a frame $I_{pred}$ that will be as similar as possible to $I_{cur}$. A first local criterion can be defined as follows:

$$C(I_{p1}, \ldots, I_{pL}, MF_{p1\leftrightarrow p2}, \ldots, MF_{pL-1\leftrightarrow pL}) = D(I_{cur}, I_{pred}) + \lambda_{cost} \cdot R(MF_{p1\leftrightarrow p2}, \ldots, MF_{pL-1\leftrightarrow pL}) \quad \text{(Eq. 6)}$$

where $D(A,B)$ is a measure of the distortion between the two frames A and B; $R()$ represents a measure of the coding cost of the motion fields, i.e. the bit-rate that is allocated to encode the motion vectors; $\lambda_{cost}$ is a predetermined lagrangian parameter that can be adapted to the level of the temporal decomposition.

$I_{pred}$ is function of the L−1 frames of the set $\{I_{p1}, \ldots, I_{pL}\}$ from which $I_{cur}$ has been removed (we note in the sequel these frames $\{F_1, \ldots, F_{L-1}\}$ for notation simplification) and of the associated motion fields. It is defined using the following linear filtering formula:

$$I_{pred} = \sum_{k=1,\ldots,L-1} \alpha_k \cdot MotComp(F_k) \quad \text{(Eq. 7)}$$

where MotComp(F) is the motion compensation of the frame F, and $\alpha_k$ is the $k^{th}$ coefficient of the filter of size L. For instance the filter coefficients $(\alpha_0 \ldots \alpha_{L-1})$ of the temporal analysis can be used.

Distortion D( ) can for instance be defined as the Sum of Square Difference (SSD) as follows:

$$D(A, B) = SSD(A, B) = \sum_{i,j} (A(i,j) - B(i,j))^2 \quad \text{(Eq. 8)}$$

Other distortions such as Sum of Absolute Difference (SAD), Mean of Square Difference (MSD) or Mean of Absolute Difference (MAD) can also be used.

In the following, the 'pairs of frames' case is considered (L=2). For instance, when D corresponds to the SSD, the objective local quality criterion is:

$$C(I_p, I_q, MF_{p\leftrightarrow q}) = \quad \text{(Eq. 9)}$$
$$\sum_{i,j} (\alpha_0 I_p(i,j) + \alpha_1 I_q(i - MF^i_{p\leftrightarrow q}(i,j), j - MF^j_{p\leftrightarrow q}(i,j)))^2 + \lambda_{cost} \cdot R(MF_{p\leftrightarrow q})$$

Typical filter coefficients are e.g. $\alpha_0$=1, $\alpha_1$=−1

In the following, the 'triplet of frames' case is considered (L=3). For instance, when D corresponds to the SSD, the objective local quality criterion is:

$$C(I_p, I_q, I_r, MF_{p\leftrightarrow q}, MF_{r\leftrightarrow q}) = \quad \text{(Eq. 10)}$$
$$\sum_{i,j} (\alpha_0 I_q(i,j) + \alpha_1 I_p(i - MF^i_{p\leftrightarrow q}(i,j), j - MF^j_{p\leftrightarrow q}(i,j)) + \alpha_2 I_r(i - MF^i_{r\leftrightarrow q}(i,j), j - MF^j_{r\leftrightarrow q}(i,j)))^2 + \lambda_{cost} \cdot R(MF_{p\leftrightarrow q}, MF_{r\leftrightarrow q})$$

Typical filter coefficients are e.g. $\alpha_0$=1, $\alpha_1$=−0.5, $\alpha_3$=−0.5

Other criteria specific to L=2 are possible, as described in the following. Another quality criterion can be the number of non-connected pixels NC that will result from the temporal filtering:

$$C_2(I_p, I_q, MF_{p\rightarrow q}) = NC(I_p, I_q, MF_{p\rightarrow q}) \quad \text{(Eq. 11)}$$

Temporal filtering comprises using the motion fields to compute the high frequency frame, or low frequency frame respectively. The motion fields used for computing these frames may contain holes, corresponding to these non-connected pixels.

A third quality criterion can be a mixture of this last criterion with the distortion criterion defined in the previous subsection, by extending the lagrangian approach to the number of non-connected pixels:

$$C_3(I_p, I_q, MF_{p\rightarrow q}) = \quad \text{(Eq. 12)}$$
$$\sum_{i,j} (I_p(i,j) - I_q(i - MF^i_{p\rightarrow q}(i,j), j - MF^j_{p\rightarrow q}(i,j)))^2 + \lambda_{cost} \cdot R(MF_{p\rightarrow q}) + \lambda_{NC} \cdot NC(I_p, I_q, MF_{p\rightarrow q})$$

where $\lambda_{NC}$ is a predetermined lagrangian parameter that can be adapted to the level of the temporal decomposition.

The following paragraphs describe Methods for Deciding the Optimal Frames Reordering.

The first described method is an exhaustive process.

An exemplary exhaustive process is the following:

At a given level n, consisting of $K_n$ frames, for each possible permutation of frames order, the total criterion $C_{total}$ is computed, and the best permutation (giving the lowest total criterion value) is retained.

For instance, if $K_n=3$, there will be 3!=6 computations of $C_{total}$, namely:
$C_{total}(0,1,2)$
$C_{total}(0,2,1)$
$C_{total}(1,0,2)$
$C_{total}(1,2,0)$
$C_{total}(2,0,1)$
$C_{total}(2,1,0)$
and the retained order will be the triplet giving the lowest value.

A second possible method is an iterative process.

It is a simpler process and described in the following:

At a given level n, consisting of $K_n$ frames,

For being able to start the reordering process, it is necessary to consider that L/2 previous frames are already available. They may for instance come from the previous analyzed GOF if it exists. If not, a mirror of each tested permutation can be used. For instance, if L=3 and the permutation (frameA, frameB, frameC) is tested, the previous frames would be frameB. These frames are denoted in the sequel $I_{-1}, \ldots, I_{-L/2}$ The current frame index i is set to 0.

While the end of the GOF is not reached ($i<K_n$),
  for each possible permutation of L/2+1 frames $\{IC_0, \ldots, IC_{L/2}\}$ among the remaining frames, the local criterion is evaluated on $(I_{i-L/2}, \ldots, I_{i-1}, IC_0, \ldots, IC_{L/2})$ with the associated motion fields. $I_{cur}$ is the first frame of the L/2+1 candidate frames, that is here $IC_0$.
  The best candidate permutation of L/2+1 frames $\{IB_0, \ldots, IB_{L/2}\}$, that is, giving the lowest local criterion value, is retained. These candidate frames are stored as ordered frames $I_i=IB_0, \ldots, I_{i+L/2}=IB_{L/2}$.
  The set of ordered frames is now $(I_0, \ldots, I_{i+L/2})$ This iterative process is, for practical and computational cost reasons, preferred to the exhaustive one.

When all possible permutations of the frames of a GOF with n frames are generated, this would result in n!= n*(n-1)* . . . *2 permutations. An example of permutations and corresponding identifiers for a GOF size of eight frames is given in Tab. 1.

TABLE 1

Possible permutations of 8 frames

| ID | Permutation |
|---|---|
| 1 | 1-2-3-4-5-6-7-8 |
| 2 | 1-2-3-4-5-6-8-7 |
| 3 | 1-2-3-4-5-7-6-8 |
| 4 | 1-2-3-4-5-7-8-6 |
| 5 | 1-2-3-4-5-8-6-7 |
| 6 | 1-2-3-4-5-8-7-6 |
| 7 | 1-2-3-4-6-5-7-8 |
| 8 | 1-2-3-4-6-5-8-7 |
| 9 | 1-2-3-4-6-7-5-8 |
| 10 | 1-2-3-4-6-7-8-5 |
| 11 | 1-2-3-4-6-8-5-7 |
| 12 | 1-2-3-4-6-8-7-5 |

TABLE 1-continued

Possible permutations of 8 frames

| ID | Permutation |
|---|---|
| 13 | 1-2-3-4-7-5-6-8 |
| ... | ... |
| 40319 | 8-7-6-5-4-3-1-2 |
| 40320 | 8-7-6-5-4-3-2-1 |

Figure 2:
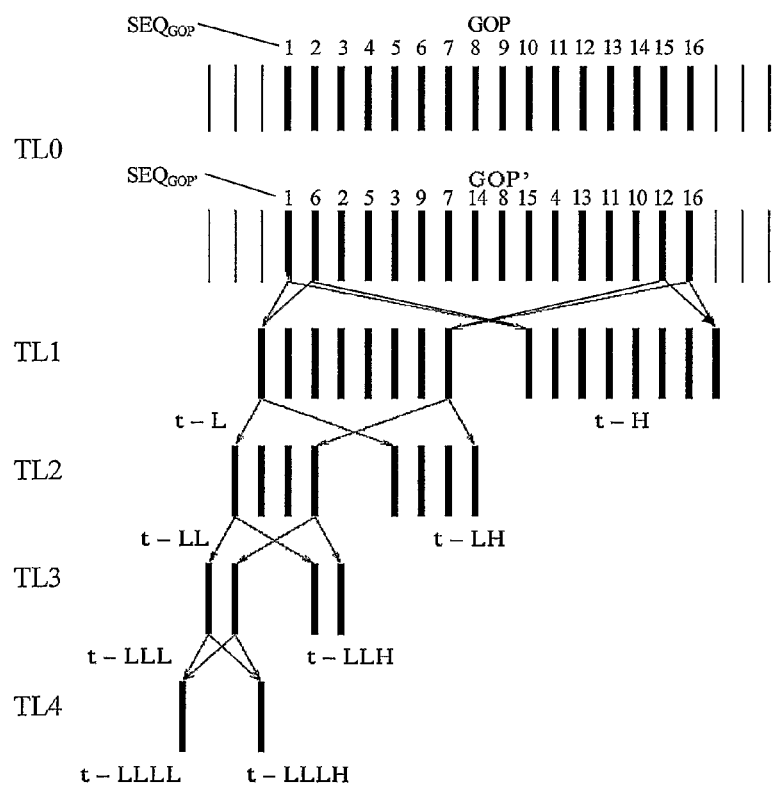
FIG. 2 a motion compensated temporal filtering (MCTF) scheme with four-level decomposition.

FIG. 2 illustrates exemplarily the inventive permutation process and the temporal filtering process for video encoding, wherein in this example groups of pictures are used. A group of pictures GOP, with each picture having a sequence number 1, . . . , 16, is permutated as described above. The resulting reordered group of pictures GOP' is regarded as an initial temporal level TL0, and is input to the Motion Compensated Temporal Filtering (MCTF). MCTF is performed on pairs of frames of GOF' to produce at a first temporal level TL1 a set of temporal low frames t-L and a set of temporal high frames t-H. In FIG. 2 e.g. the first of the temporal low frames t-L and the first of the temporal high frames t-H are the result of filtering the first two frames of GOF', with initial sequence numbers 1 and 6. A motion field is estimated between each pair of filtered frames. While in this exemplary picture the frames are only permuted at the initial temporal level TL0, it becomes apparent from the previous description that the frames can also be permuted at some or all levels TL1, . . . , TL4 beyond the initial temporal level TL0. The temporal low frames are decomposed again with the same MCTF method, whereby at a second temporal level TL2 temporally lower t-LL and temporally higher t-LH frames are produced. This is usually repeated until the temporal lowest frame t-LLLL remains.

Figure 3:
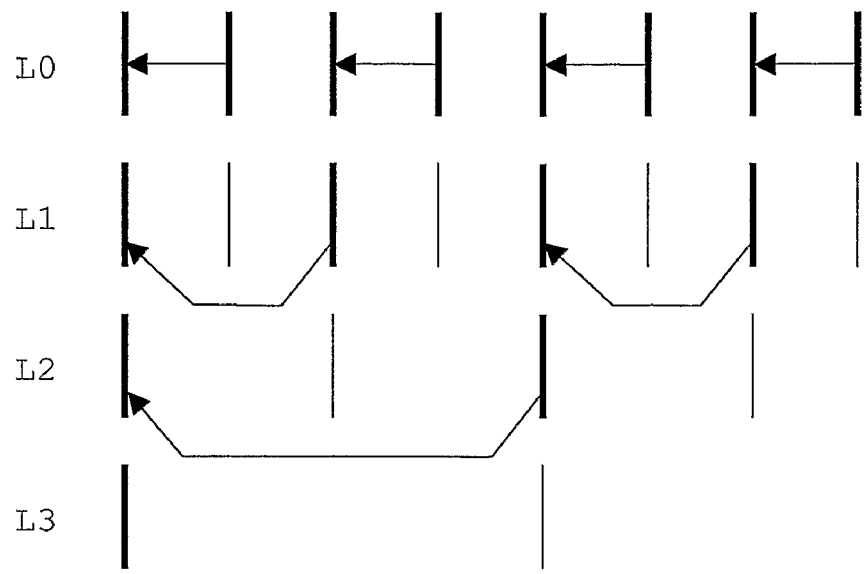
FIG. 3 a basic GOP temporal decomposition scheme.

For a GOF/GOP size of sixteen frames the result is the five-band temporal decomposition shown in FIG. 2, with one t-LLLL frame, one t-LLLH frame, two t-LLH frames, four t-LH frames, and eight t-H frames per GOP. The temporally lowest decomposed frame t-LLLL and the higher decomposed frames t-LLLH, t-LLH, t-LH, and t-H are usually used for encoding. Exemplarily, a commonly used temporal decomposition scheme is depicted in FIG. 3. It is the classical GOP structure used in 2D+t wavelet coding schemes based on Haar filtering. The temporal decomposition is predetermined and the temporal distance between filtered frames increases with each decomposition level. At the initial level L0, successive frames are filtered together, wherein each filtering results in a temporal low and a temporal high frame. At the next level, successive temporal low frames are further filtered, while the temporal high frames are encoded. Hence, at the first level L1 the distance between a pair of filtered low frames is 2 frames, and at the second level L2 the distance is 4 frames.

In state-of-the-art systems it is predetermined which frames of a GOP make a pair, and therefore the motion estimation process becomes more difficult at each decomposition level, because it generally results in more and more unconnected pixels, i.e. pixels that cannot be predicted using motion estimation, so that low and high pictures become more costly to encode. Advantageously the inventive method may reduce the bandwidth required for video transmission or storage by more efficient encoding, as compared to known methods.

Figure 4:
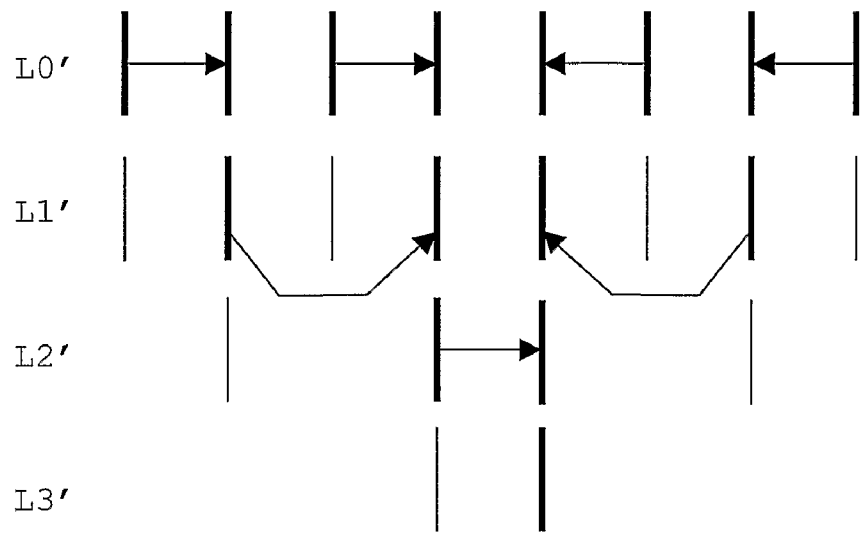
FIG. 4 an alternative GOP temporal decomposition scheme.

Another temporal decomposition scheme is depicted in FIG. 4 and described in the following. Though it was proposed for alternative usage in prior art systems as an approach to minimize the average temporal distance between pairs of frames, it still provides no flexibility regarding the selection of frame pairs for filtering, since it uses a fixed decomposition scheme. It can be combined with the inventive method by applying it to different permutations of frames, as described above. However, when equivalent permutations of input frames are considered, this temporal decomposition scheme will lead to the same result than the previously described temporal decomposition scheme, since the resulting pairs of frames for filtering will be the same.

The basic idea of the temporal decomposition process depicted in FIG. 4 was to reduce at each level the temporal distance between filtered frames. In prior art systems, this can be achieved by swapping reference frame and predicted frame on the basic level L0' for the first half of the GOF. Thus, for the first half of the GOF it is the "later" frame that becomes the temporal low frame, while for the second half of the GOF the "earlier" frame is the temporal low frame, so that on average the distance between filtered frames is lower than in the previously described scheme.

However, other than for known temporal decomposition approaches, which all have predetermined decomposition schemes, the inventive method takes into account that it is not guaranteed that temporally close frames will really generate the lowest possible coding cost or number of non-connected pixels.

Figure 5:
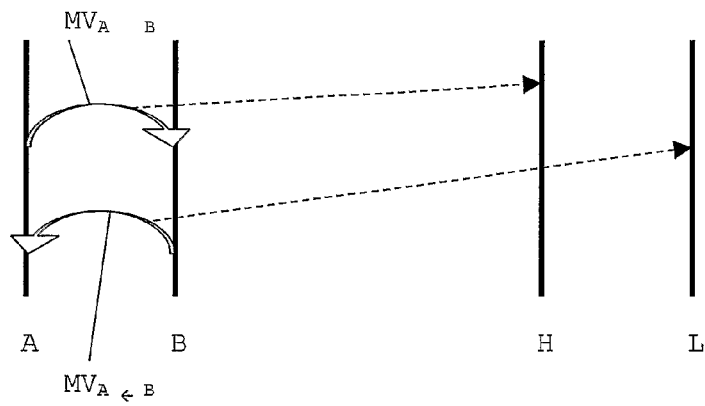
FIG. 5 a simplified temporal filtering process.

In the following, the temporal filtering of frames is described in more detail. This process is just given as an example, for the limited case of temporal filtering applied on pairs of frames. The temporal filtering works on pairs of pictures, or frames respectively. When considering a pair of pictures A and B, as shown in FIG. 5, the temporal filtering process consists of applying a low-pass filter and a high-pass filter to get a low frequency band picture L and a high frequency band picture H. The low-pass filter generates a kind of average value of two pictures, while the high-pass filter generates a difference. A simplified version of this process corresponds to the following equations:

$$L = (B + MC(A))/\sqrt{2} \quad \text{(Eq. 1.1)}$$

$$H = (A - MC(B))/\sqrt{2} \quad \text{(Eq. 1.2)}$$

wherein MC(I) corresponds to the motion compensation of picture I.

To get the low frequency band picture L, the motion between picture B and A is needed, i.e. forward motion vectors $MV_{A\_B}$ starting from B and with A as reference picture. To get the high frequency band picture H, the motion between picture A and B is needed, i.e. backward motion vectors $MV_{A\_B}$ starting from A and with B as reference picture. Practically, only one motion field is generated, e.g. the motion field $MV_{A\_B}$ from A to B, and the other one is deduced.

Figure 6:
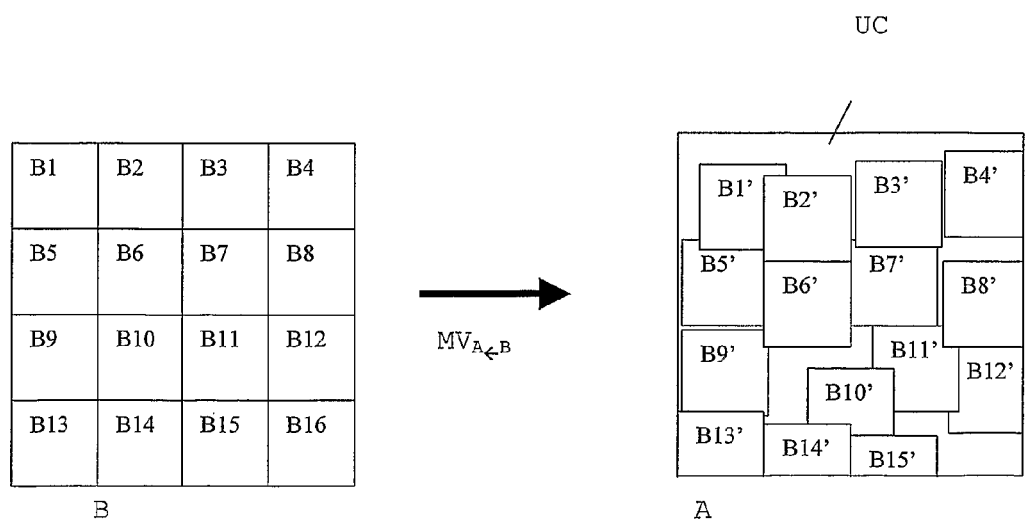
FIG. 6 motion compensation blocks in a pair of frames.

This generates so-called non-connected pixels, also called unconnected pixels, as shown in FIG. 6. Non-connected pixels are pixels that are not used for motion estimation, and therefore correspond to holes in the motion field. The current frame, e.g. B in FIG. 6, is divided into pixel blocks B1, ..., B16, wherein the pixel blocks can have any shape, and the motion estimation tries to find for each of the blocks B1, ..., B16 in a reference frame A the same pixel block B1', ..., B16'. These pixel blocks can e.g. be moving objects. The motion estimation results in motion vectors $MV_{A\_B}$ that determine for pixel blocks of one frame where they have moved in the other frame, or where they can be found in the other frame respectively. Unconnected pixels UC can be pixels in the reference frame A that have no motion vector starting from them, or it can be vector-less pixel in the current frame B. E.g. pixel block B16 is an unconnected block in frame B since it is not contained in frame A. Since these pixels cannot be deduced, they must be separately coded, which is also called intra-coded. The other pixels are called connected or inter-coded. The quality and efficiency of the transform, and thus of the encoding process, is higher when more pixels are connected. Therefore the additional flexibility provided by the invention can increase the encoding quality, or rather optimise it with respect to spatio-temporal filtering.

As a further example, assume different sequences of eight frames. Again, this example is given for the case where motion estimation and temporal filtering is applied on pairs of frames. Note that the invention permits considering more than two frames.

A first sequence may be A1-B1-B2-C1-C2-B3-B4-A2, i.e. the first and the last frame A1,A2 being similar, the second, third, sixth and seventh frame B1, ..., B4 being similar and the fourth and fifth frame C1,C2 being similar.

State-of-the-art temporal decomposition will at the first level filter the following pairs of frames: A1-B1, B2-C1, C2-B3 and B4-A2. The inventive method instead is able to rearrange the frames, so that e.g. the following frame pairs may be filtered at the first-level: A1-A2, B1-B2, B3-B4 and C1-C2. Since the frame pairs are more similar, they contain less unconnected pixel. E.g. the frame A2 is much more similar to A1 than to B4, therefore the inventive method can encode it with less bits. Generally, the inventive method can make better use of redundancy between non-consecutive frames of a GOP, and encode the temporally higher frame with fewer bits.

Also at the second level the processing may be easier. State-of-the-art temporal decomposition will filter the following frames: L(A1-B1)-L(B2-C1) and L(C2-B3)-L(B4-A2). The number of unconnected pixel will be high because all filtered frame pairs are different.

The inventive temporal decomposition instead may filter the following frames: L(A1-A2)-L(C1-C2) and L(B1-B2)-L(B3-B4). This results in reduced coding cost e.g. for the temporally higher frame H(L(B1-B2)-L(B3-B4)). The same applies to all further filtering levels.

Assuming that all 8!=40320 permutations of frames are allowed, sixteen bit are sufficient to uniquely identify the selected combination. However, several of these permutations lead to a very similar result, and can therefore be regarded as redundant, so that the number of permutations leading to different results is much smaller. E.g. when assuming that filtering two frames has the same result, independent of which of them is the reference frame or the current frame, then the number of different permutations is in the above case for the first level 8!/16=2520, because always 16 combinations are equivalent.

In an iterative process, the number of permutations to be considered is even smaller. E.g. for a group of 8 frames and filtering frame pairs, the first frame is combined with 7 other frames, and an optimum matching frame is selected. From the remaining 6 frames, the next has only 5 others to consider etc., so that the number of potential frame pairs is N=(n−1)+(n−3)+ ... +1.

The permutations leading to different filtering results can be listed in a permutation table that is available at the encoder and at the decoder. If the list contains for each entry an identifier, e.g. entry number, it is sufficient to provide the identifier to the decoder, so that it can rearrange the frames to their original order. Instead of a table, the different permutations can be calculated using a defined algorithm. Alternatively, the utilized sequence of frame numbers can be transmitted, so that the decoder receives the order of frames in the bitstream. This has the advantage that no permutation table is required, neither at the encoder nor at the decoder. For the above example the frames may be numbered 0, ..., 7 and the selected sequence is 0-7-1-2-5-6-3-4, which can be encoded with 8*3=24 bit.

Particularly when one of the allowed permutations is the original sequence or an equivalent, the inventive method will never result in coding costs that are higher than generated by state-of-the-art encoders.

The invention can be used in all video encoders and decoders that use temporal filtering, and in particular motion compensated temporal filtering.

FIG. 7 shows an exhaustive process according to the invention. In a first step S0 the frames of a GOF are assigned an initial order, which gets an identifier value, e.g. P=0. In the easiest case, the order remains as it is, so that the first frame with frame number #0 gets order number $O_0$, next frame #1 gets order number $O_1$ etc. In the next step S1 all possible frame sets of given size L are selected, i.e. a set contains L frames. In the case where frame pairs are filtered (L=2), sets of frame pairs are selected.

In the next step S2 motion estimation is performed for successive pairs of frames within the frame sets. The following step S3 calculates a global criterion value $C_P$, as described above. This value is stored together with the identifier P in step S4. If further permutations exist, the order of frames is modified in step S5 by assigning different order numbers to the frames.

When a predefined amount of permutations, or all, have been considered, and all the respective global criterion values $C_P$ are stored, these values are compared and the minimum value $C_{min}$ is determined in step S6. The associated order number $P_{opt}$ defines the optimal order of frames within the GOF.

In one embodiment of the invention, the method for encoding video data comprises including the steps of
performing spatio-temporal filtering on different combinations of the frames of a first temporal decomposition level, wherein subgroups of the frames are filtered together;
calculating for each filtered combination of the frames of the first temporal decomposition level a coding cost value;
storing the coding cost value together with an identifier for the used combination of frames;
determining the optimal sequential frame order within the first temporal level, being the combination with the lowest coding cost value;
filtering the frames of the first temporal level in the optimal sequential order; and
associating the identifier for the optimal sequential order of frames with the encoded bitstream.

In video encoding, the video frames are spatio-temporally filtered for reduction of spatial and temporal redundancy before they are entropy encoded. Known filtering schemes consider temporally successive frames and are static. It is probable but not necessary that successive frames are most efficient to encode. Therefore, different frames order are considered and evaluated based on a global criterion, which is the sum of local criterion values computed over not joined sets of successive frames considered in the new order. The local criterion value is deduced from motion estimation processed on each considered set of frames. The best ordering is chosen as the one that minimizes the global criterion value.

The invention claimed is:

1. Method for encoding video data, the video data being structured into groups of frames, wherein the frames within a group have an initial sequential order and initial sequence numbers (1, ..., 16), and wherein motion compensated temporal filtering of frames is used on a plurality of temporal decomposition levels, including the generation of motion vectors, the method comprising adaptive frame ordering including the steps of
permuting K frames, K being a number lower or equal to the number of frames of the GOP;
performing a motion estimation on successive subsets of the permuted frames, wherein for each subset a local criterion value is calculated, the local criterion value being a measure for the similarity between the frames in the subset, and storing the local criterion value;
computing for the current permutation a global criterion value from said stored local criterion values, wherein the global criterion value is a measure for the coding cost resulting from the current permutation of the frames, the coding cost being the amount of bits used for encoding;
storing the global criterion value of the current permutation and an identifier associated with the current permutation;
repeating for a plurality of, or all possible, frame order permutations said steps of permuting K frames, performing motion estimation on subsets of the permuted frames, wherein said local criterion values are calculated, computing a global criterion value and storing the global criterion value associated with an identifier for the respective permutation;
choosing from the processed permutations the one with the lowest coding cost as the initial order of the frames; and
filtering the frames of the first temporal level in the chosen sequential order of frames.

2. Method according to claim 1, wherein the different combinations of frames comprise all permutations of the frames of the current temporal decomposition level that require either only forward motion estimation or only backward motion estimation.

3. Method according to claim 1, wherein the adaptive frame ordering is applied to further or all temporal decomposition levels of the motion compensated temporal filtering.

4. Method according to claim 1, wherein the calculation of the coding cost value includes at least one of calculation of the prediction error of the motion compensation, calculation of the bit-rate used to encode the motion vectors, or calculation of the number of unconnected pixels.

5. Method according to claim 1, wherein a maximum temporal distance is allowed between the frames being filtered together.

6. Method for decoding encoded video data, the video data being structured in groups of frames and being wavelet encoded using motion compensated temporal filtering, the method including the steps of
extracting reordering information from the encoded video data, the reordering information comprising the utilized sequence of frame numbers for encoding and/or a respective indication of the utilized permutation of the frames, wherein the difference of frame numbers between reordered successive frames is arbitrary;
performing spatio-temporal synthesis of subgroups of frames within a temporal level; and
temporally reordering the synthesized frames within the temporal level according to said extracted reordering information.

7. Apparatus for encoding video data, the video data being structured into groups of frames, wherein the frames within a group have an initial sequential order and initial sequence numbers (1, ..., 16), and wherein motion compensated temporal filtering of frames including the generation of motion vectors is used on a plurality of temporal decomposition levels, the apparatus including means for permuting K frames, K being a number lower or equal to the number of frames of the GOP;

means for selecting a current permutation from a plurality of, or all possible, frame order permutations;

means for performing a motion estimation on successive subsets of the permuted frames of the current permutation, wherein for each subset a local criterion value is calculated, the local criterion value being a measure for the similarity between the frames in the subset;

means for storing the local criterion value;

means for computing for the current permutation a global criterion value from said stored local criterion values, wherein the global criterion value is a measure for the coding cost resulting from the current permutation of the frames, the coding cost being the amount of bits used for encoding;

means for storing the global criterion value of the current permutation and an identifier associated with the current permutation;

means for comparing the global criterion values of the processed permutations and selecting the permutation with the lowest coding cost as the initial order of the frames; and filter for filtering the frames of the first temporal level in the chosen sequential order of frames.

8. Apparatus according to claim 7, wherein the filtering is applied to further or all temporal decomposition levels of the motion compensated temporal filtering.

9. Apparatus for decoding encoded video data, the video data being structured in groups of frames and being wavelet encoded using motion compensated temporal filtering, the apparatus including means for extracting reordering information from the encoded video data, the reordering information comprising the utilized sequence of frame numbers for encoding and/or a respective indication of the utilized permutation of the frames, wherein the difference of frame numbers between reordered successive frames is arbitrary;

means for performing spatio-temporal synthesis of subgroups of frames within a first temporal level; and means for temporally reordering the frames within the first temporal level according to the extracted reordering information.

10. Apparatus according to claim 9, wherein the spatio-temporal synthesis and temporal reordering of frames is applied to further or all temporal decomposition levels of the motion compensated temporal filtering.

* * * * *